US011724830B2

(12) United States Patent
Inman et al.

(10) Patent No.: US 11,724,830 B2
(45) Date of Patent: Aug. 15, 2023

(54) PLENUM PLATE STANDOFF SPOOLS FOR SEPARATING A PAIR OF PLENUM PLATES IN A NUCLEAR REACTOR

(71) Applicant: BWXT Nuclear Energy, Inc., Lynchburg, VA (US)

(72) Inventors: James B. Inman, Forest, VA (US); Steven M. Delessio, Madison, AL (US); Andrew C. Whitten, Lynchburg, VA (US); Curtis G. Hamilton, Lynchburg, VA (US)

(73) Assignee: BWXT Nuclear Energy, Inc., Lynchburg, VA (US)

( * ) Notice: Subject to any disclaimer, the term of this patent is extended or adjusted under 35 U.S.C. 154(b) by 13 days.

(21) Appl. No.: 17/025,755

(22) Filed: Sep. 18, 2020

(65) Prior Publication Data

US 2021/0094706 A1    Apr. 1, 2021

Related U.S. Application Data

(60) Provisional application No. 62/903,280, filed on Sep. 20, 2019.

(51) Int. Cl.
*B64G 1/40*     (2006.01)
*G21C 13/028*   (2006.01)
*G21C 5/10*     (2006.01)

(52) U.S. Cl.
CPC .............. *B64G 1/408* (2013.01); *G21C 5/10* (2013.01); *G21C 13/028* (2013.01)

(58) Field of Classification Search
CPC ......... B64G 1/408; G21C 13/028; G21C 5/10
USPC ................ 376/203, 318, 383, 391, 444, 446
See application file for complete search history.

(56) References Cited

U.S. PATENT DOCUMENTS

| 3,674,637 | A |   | 7/1972  | Delafosse et al.          |
|-----------|---|---|---------|---------------------------|
| 4,094,558 | A |   | 6/1978  | Christiansen              |
| 4,123,327 | A |   | 10/1978 | Sugisaki et al.           |
| 4,219,386 | A | * | 8/1980  | Osborne ........ G21C 3/331|
|           |   |   |         | 376/446                   |
| 5,180,265 | A | * | 1/1993  | Wiese ............ F16B 39/08|
|           |   |   |         | 411/150                   |
| 5,844,957 | A |   | 12/1998 | Johannesson et al.        |
| 10,124,472| B2| * | 11/2018 | Ullmann ........ G21C 3/331|
| 2017/0263345 | A1 |   | 9/2017  | Venneri et al.         |

(Continued)

FOREIGN PATENT DOCUMENTS

WO    2019164617 A2    8/2019

OTHER PUBLICATIONS

International Search Report and Written Opinion, PCT/US2020/051578, dated Feb. 5, 2021, 9 pages.

*Primary Examiner* — Jack W Keith
*Assistant Examiner* — Daniel Wasil
(74) *Attorney, Agent, or Firm* — Nelson Mullins Riley & Scarborough LLP (57) ABSTRACT

A nuclear reactor has first and second plenum plates disposed in a pressure vessel. Both plenum plates have a plurality of apertures. The second plenum plate is parallel to the first plenum plate. A fuel element includes a fuel element coolant flow tube which extends through aligned apertures of the parallel plenum plates. A fuel element standoff spool is disposed about a portion of the fuel element coolant flow tube which is located between the plenum plates. The nuclear reactor is also usable in nuclear thermal propulsion.

17 Claims, 12 Drawing Sheets

(56) References Cited

U.S. PATENT DOCUMENTS

| | | |
|---|---|---|
| 2017/0309352 A1 | 10/2017 | Helmersson et al. |
| 2018/0277260 A1 | 9/2018 | Marcille et al. |
| 2019/0096536 A1 | 3/2019 | Arafat et al. |

* cited by examiner

PLENUM PLATE STANDOFF SPOOLS FOR SEPARATING A PAIR OF PLENUM PLATES IN A NUCLEAR REACTOR

CROSS-REFERENCE TO RELATED APPLICATION

This application claims priority to U.S. provisional patent application No. 63/903,280 filed Sep. 20, 2019, the disclosure of which is incorporated by reference herein.

GOVERNMENT SUPPORT CLAUSE

This invention was made with government support under Subcontract 00212687 to DOE Award No. DE-AC07-051D14517 and NASA Prime Contract 80MSFC17C0006. The Government has certain rights in this invention.

TECHNICAL FIELD

The presently-disclosed invention relates generally to nuclear reactors and, more specifically, to internal support structures for supporting various internal components of nuclear reactors used in nuclear thermal propulsion.

BACKGROUND

Figure 1:
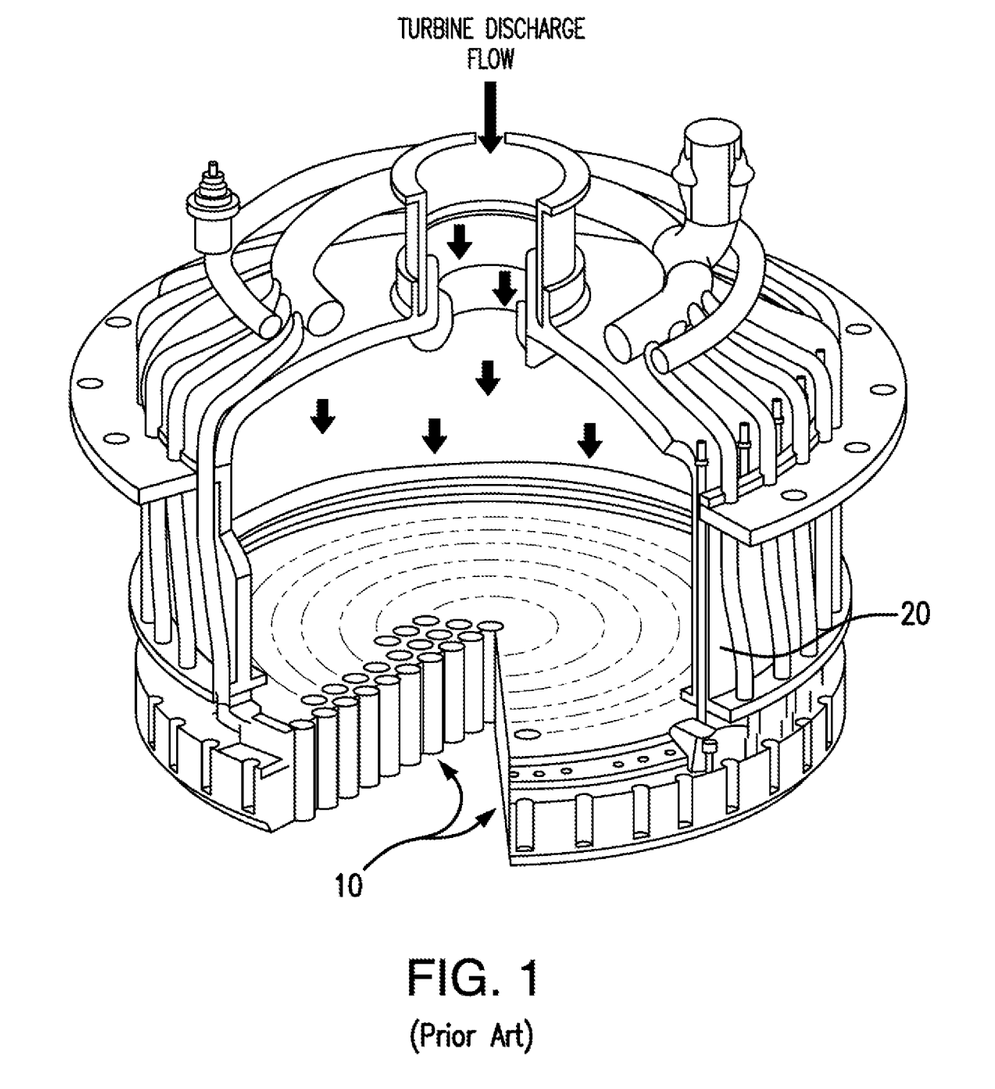
FIG. 1 is a partial cross-sectional view of a prior art Nuclear Engine for Rocket Vehicle Application (NERVA) design, showing the plenums.

The concept of utilizing nuclear thermal propulsion (NTP) to propel spacecraft during space travel is known. In developing the technology related to propelling spacecraft in this manner, it is necessary to be able to test the NTP engines and be able to both assemble and disassemble the engines so that their internal components can be inspected. Preferably, nuclear reactors for NTP engines are compact, lightweight, and due to the extreme conditions in which the nuclear reactors must function, readily assembled and disassembled for rigorous testing during the developmental phase. Various issues exist with regard to existing NTP engine designs, such as Nuclear Engine for Rocket Vehicle Application (NERVA), a portion of which is shown in FIG. 1. Specifically, the assembly and disassembly of existing designs is known to be both complicated and time consuming. As well, it is important that the ability to install and remove each moderator element and fuel element from the core exists without the need for on-site welding and welding inspections.

Figure 2:
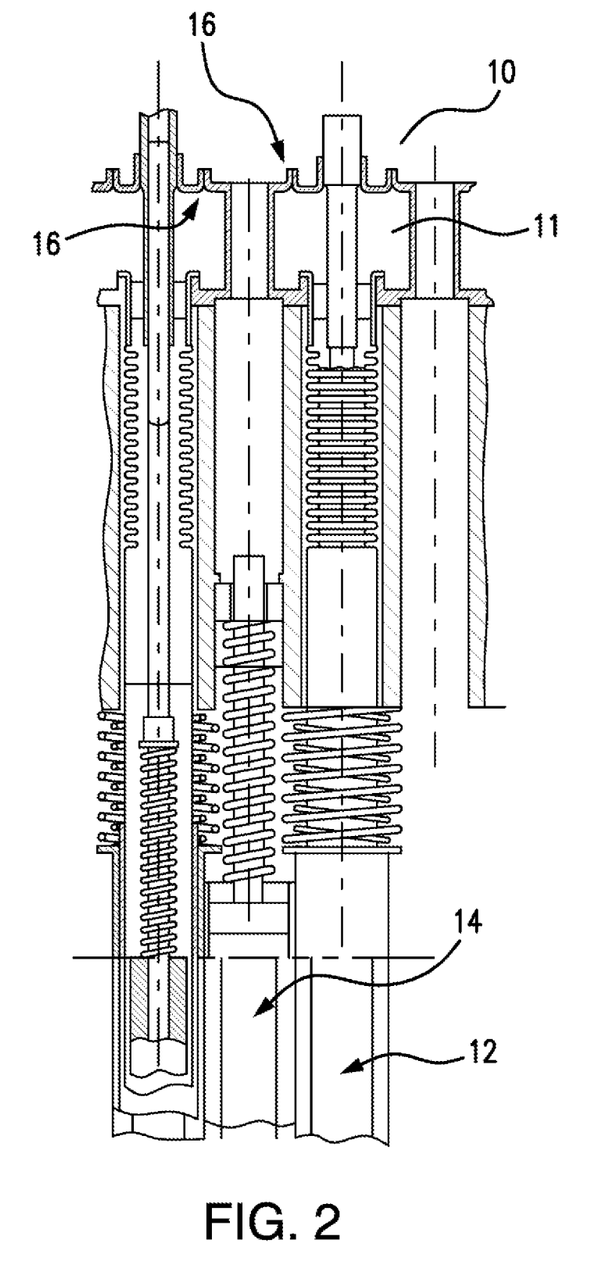
FIG. 2 is a partial cross-sectional view of the plenum region of the NERVA design shown in FIG. 1.

Referring additionally to FIG. 2, plenums such as fuel inlet plenum 10 and moderator outlet plenum 11 are located within the reactor vessel 20 above the reactor core and are used to direct coolant gas into and out of core via element flow tubes. Each separate plenum contains coolant gases with differing pressures. To reduce gas leaking between the plenums, as in previous Nuclear Engine for Rocket Vehicle Application (NERVA) designs, the moderator element and fuel element coolant flow tubes 12 and 14, respectively, were welded (at 16) to the plenum plates, as shown in FIG. 2. Leakage of gas between the plenums reduces the reactor's specific impulse (Isp). Welding of the moderator element and fuel element flow tubes 12 and 14 requires cutting the fuel elements and moderator elements from the support plates during disassembly for inspection and maintenance.

There at least remains a need, therefore, for improved devices for NTP engines that can be more easily assembled and disassembled for inspection and maintenance purposes during testing operations.

SUMMARY OF INVENTION

One embodiment of the present disclosure includes a nuclear reactor having a pressure vessel, the reactor including a first plenum plate disposed within the pressure vessel, the first plenum plate defining a first plurality of apertures, a second plenum plate disposed within the pressure vessel, the second plenum plate being parallel to the first plenum plate and defining a first plurality of apertures, a fuel element including a fuel element coolant flow tube, the fuel element coolant flow tube extending through a first one of both the first pluralities of apertures of both the first and the second plenum plates, and a first fuel element plenum plate standoff spool having a first end surface and a second end surface, the first fuel element plenum plate standoff spool being disposed about a portion of the fuel element coolant flow tube that is disposed between the first and the second plenum plates, wherein the first and the second end surfaces of the first fuel element plenum plate standoff spool abut the first and the second plenum plates, respectively.

Another embodiment of the present disclosure includes a nuclear reactor having a pressure vessel, including a first plenum plate disposed within the pressure vessel, the first plenum plate defining a first plurality of apertures, a second plenum plate disposed within the pressure vessel, the second plenum plate being parallel to the first plenum plate and defining a first plurality of apertures, a fuel element including a fuel element coolant flow tube, the fuel element coolant flow tube extending through a first one of both the first pluralities of apertures of both the first and the second plenum plates, and a first fuel element plenum plate standoff spool being disposed about a portion of the fuel element coolant flow tube that is disposed between the first and the second plenum plates.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

As used herein, terms referring to a direction or a position relative to the orientation of the fuel-fired heating appliance, such as but not limited to "vertical," "horizontal," "upper," "lower," "above," or "below," refer to directions and relative positions with respect to the appliance's orientation in its normal intended operation, as indicated in the Figures herein. Thus, for instance, the terms "vertical" and "upper" refer to the vertical direction and relative upper position in the perspectives of the Figures and should be understood in that context, even with respect to an appliance that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 17:
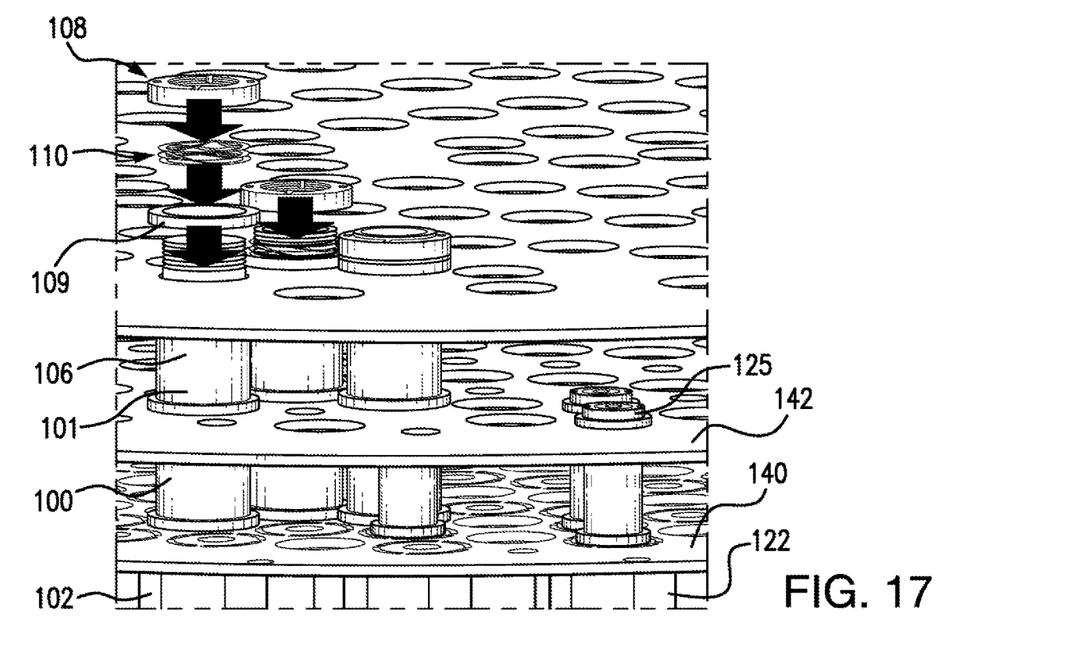
FIG. 17 is a perspective view of the fuel element plenum plate standoff spools as secured to the plenum plates.

Prior to a detailed discussion of the design and method of assembly of both the moderator element plenum plate standoff spool 120 and the fuel element plenum plate standoff spools 100 and 101, in accordance with the present disclosure, a brief overview of the plenum plate standoff spools is provided. The plenum plate standoff spools 100, 101, 120 provide a gas seal between the plenum plates of the reactor while allowing for the necessary hydrogen gas flow. As well, the plenum plate standoff spools 100, 101, 120 provide a means for assembly/disassembly of the core without subsequent cutting of the components due to welds. To eliminate the need to weld the fuel element 102 (FIG. 6) coolant flow tubes 104 to the corresponding plenum plates, each of the fuel element coolant flow tubes 104 has a threaded top end 106 that is attached to the corresponding plenum plate by a locking nut 108 (FIG. 17). Note, in alternate embodiments the locking nut 108 may be replaced by an annular collar (not shown) that is shaped similarly to the nut, but is attached to the top end 106 of the corresponding fuel element coolant flow tube 104 by a pin that is received in corresponding holes, swaging, flaring the open end of the flow tube, welding, etc.

Each of the plenum plates require a clearance hole large enough to allow the flow tubes to pass through. In prior art designs, the clearance gap would allow coolant gas to escape through the plenum plates unless properly sealed. In the present design, to address thermal expansion in the flow tubes and plenum plates, a wave spring 110 (FIG. 17) is disposed between the locking nut 108 and plenum plate. Due to locking all the fuel element coolant flow tubes 104 with downward force to the plenum plates, the downward force may produce a bending force on the plenum plates that may allow leaks to occur. To overcome the bending forces and minimize bypass flow around each fuel element coolant flow tube 104, the plenum plate standoff spools 100, 120 are used.

Hydrogen gas is used to cool the NTP reactor components and is also used as a propellant for thrust. In order for the NTP reactor 202 (FIGS. 3A, 3B, and 3C) to go critical and generate heat in the reactor fuel, enriched uranium nuclear reactors rely on neutron moderating materials to thermalize, or slow, neutrons released in the fission process. Moderation of neutrons in a nuclear reactor's core is required to sustain the nuclear chain reaction in the core, thereby producing heat. This moderating material must be cooled so as not to melt. The same hydrogen gas is also routed through other areas of the reactor for coolant. The hydrogen gas exits the reactor by passing through and being heated within the fuel elements, thereby producing thrust.

Figure 3A:
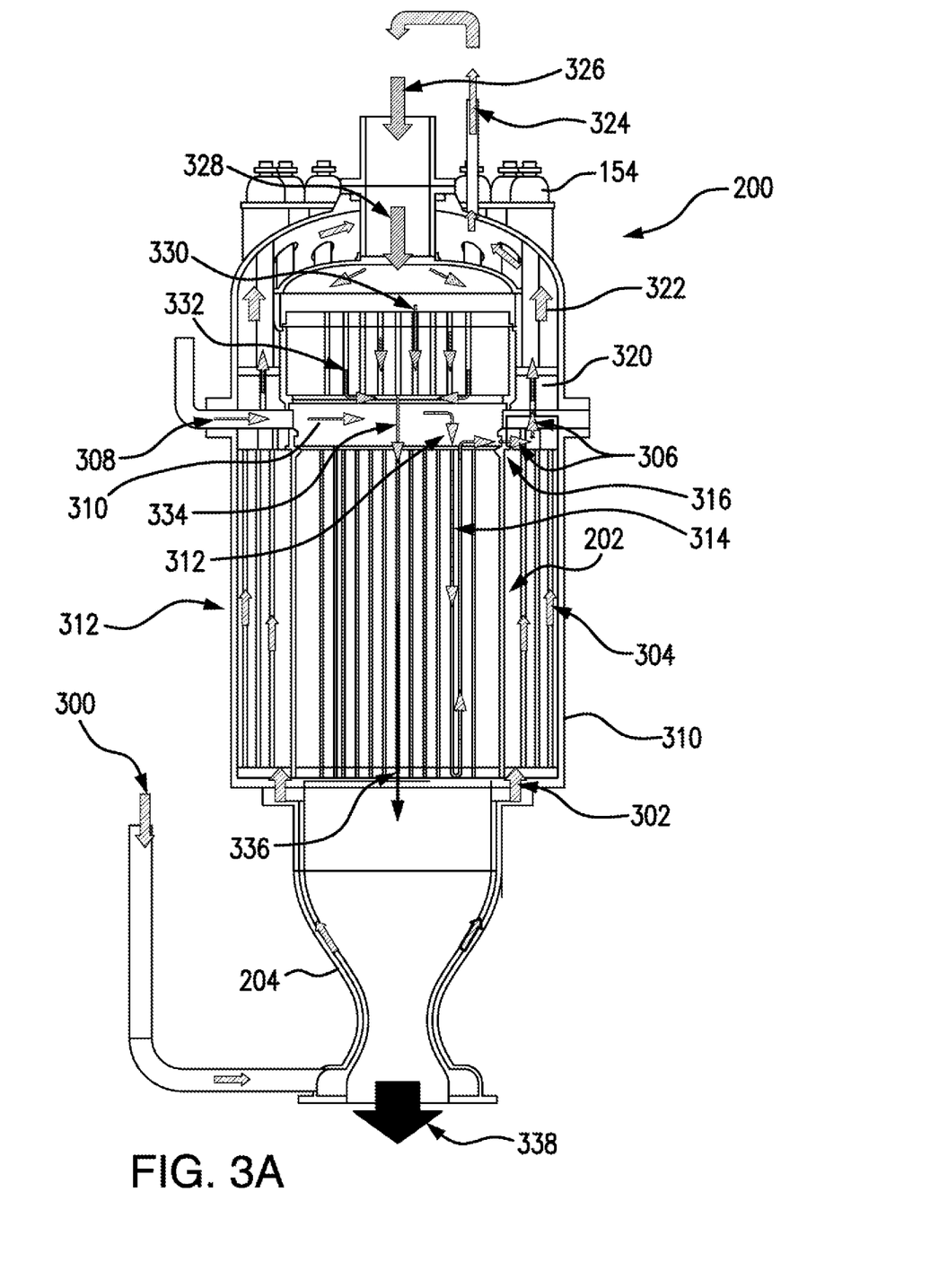
FIGS. 3A and 3B are cross-sectional views of a nuclear thermal propulsion rocket engine including fuel element plenum plate standoff spools as shown in FIGS. 8 through 17.
Figure 3B:
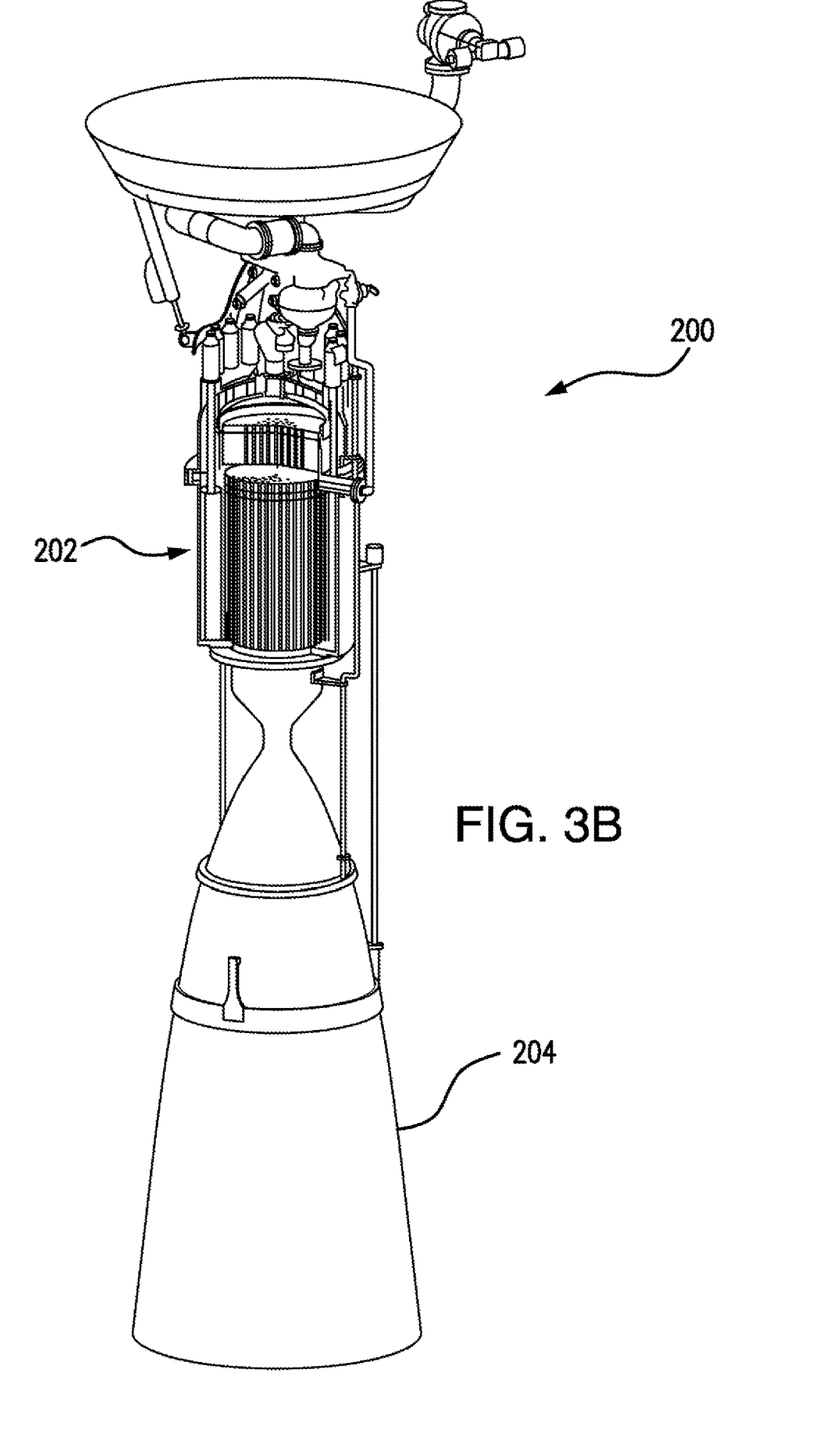
Figure 3C:
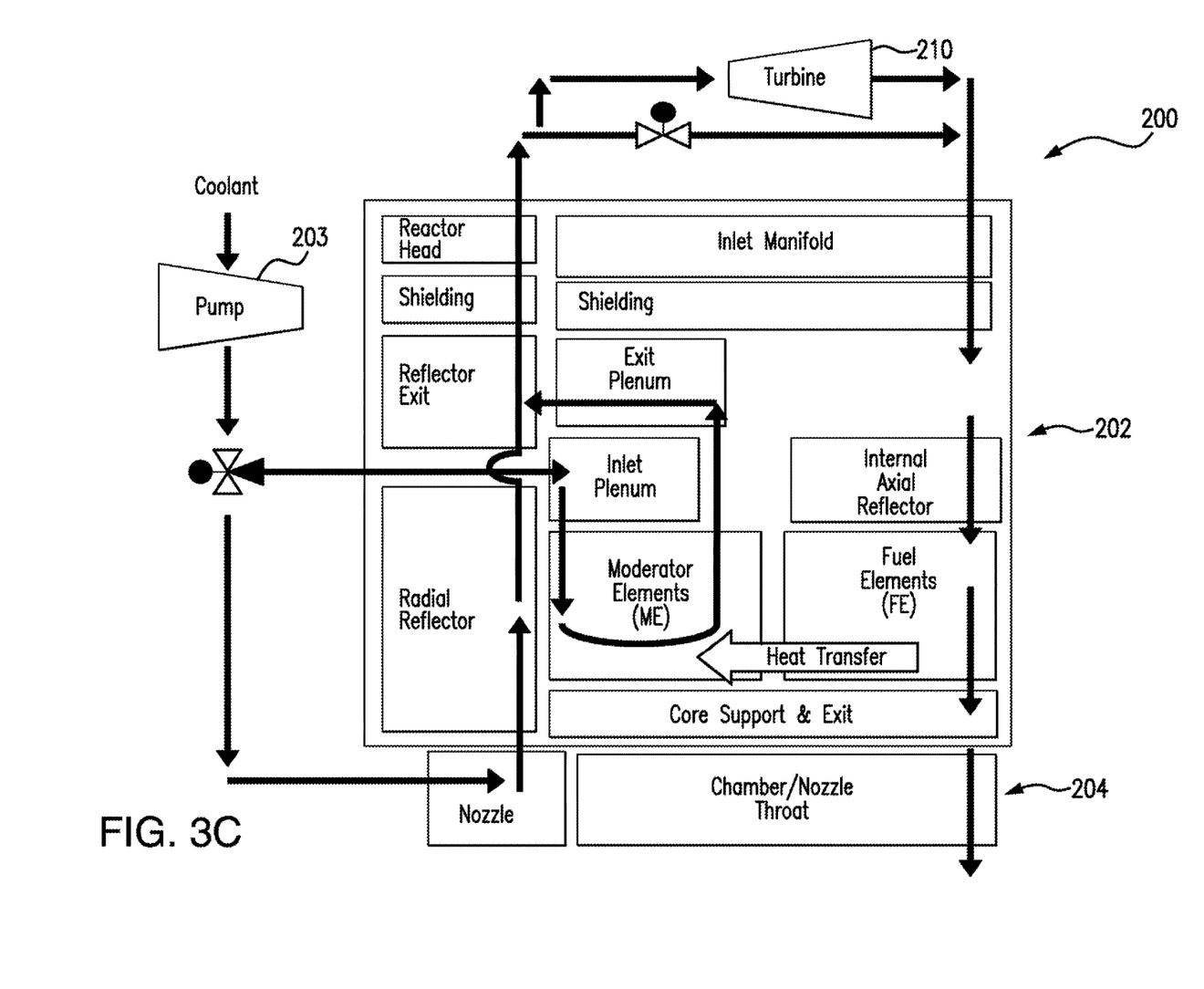
FIG. 3C is a diagrammatic flow chart of the nuclear thermal propulsion rocket engines shown in FIGS. 3A and 3B.

Still referring to FIGS. 3A, 3B, and 3C, coolant flow through reactor core 202 of a NTP rocket engine 200 is shown. Coolant from an external turbo pump 203 enters the nozzle 204 at 300, coolant from the nozzle enters reactor vessel at 302, through holes in the bottom of reactor vessel 210, coolant passes through the reflector and the control drums at 304, coolant exits the reflector and the control drums and enters upper plenum at 306, where internal mixing of the coolant from the nozzle and moderator occurs. Additionally, coolant from the external turbo pump 203 enters coolant pathway of interface structure at 308, coolant next enters moderator entrance plenum at 310, the coolant next enters moderator inlet tube at 312, the coolant next flows through the moderator at 314, after a 180° change in the direction of flow, the coolant passes upwardly through the moderator into the moderator exit plenum 142 and out the moderator exit plenum at 316 through holes, enters the upper plenum where it undergoes internal mixing at 306 with the coolant that entered through the nozzle 204. The coolant passes upwardly through holes in the annular flange of the interface structure and through holes of the neutron and gamma shields at 320, passes upwardly through reactor head at 322 into the inlet of a turbo pump 324, the coolant exits the turbo pump at 326 and enters the central dome at 328, after passing through the internal neutron and gamma shields at 330, the coolant enters the fuel element plenum at 332, and passes next into the fuel element inlet tube at 334, ultimately passing through the fuel elements at 336 and exiting the NTP rocket engine nozzle 204 as exhaust at 338.

Figure 8:
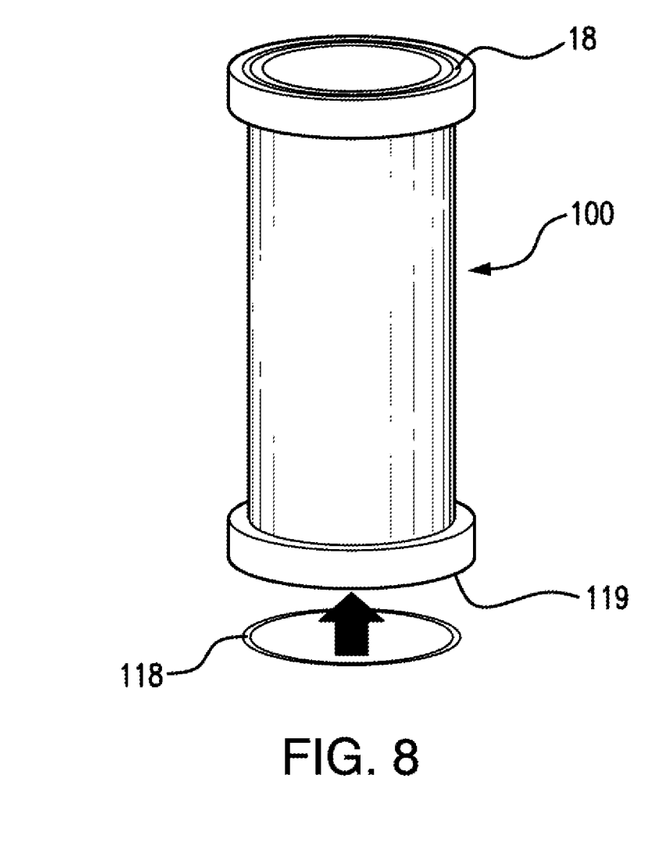
FIG. 8 is a perspective view of a fuel element plenum plate standoff spool in accordance with an embodiment of the present invention.
Figure 9:
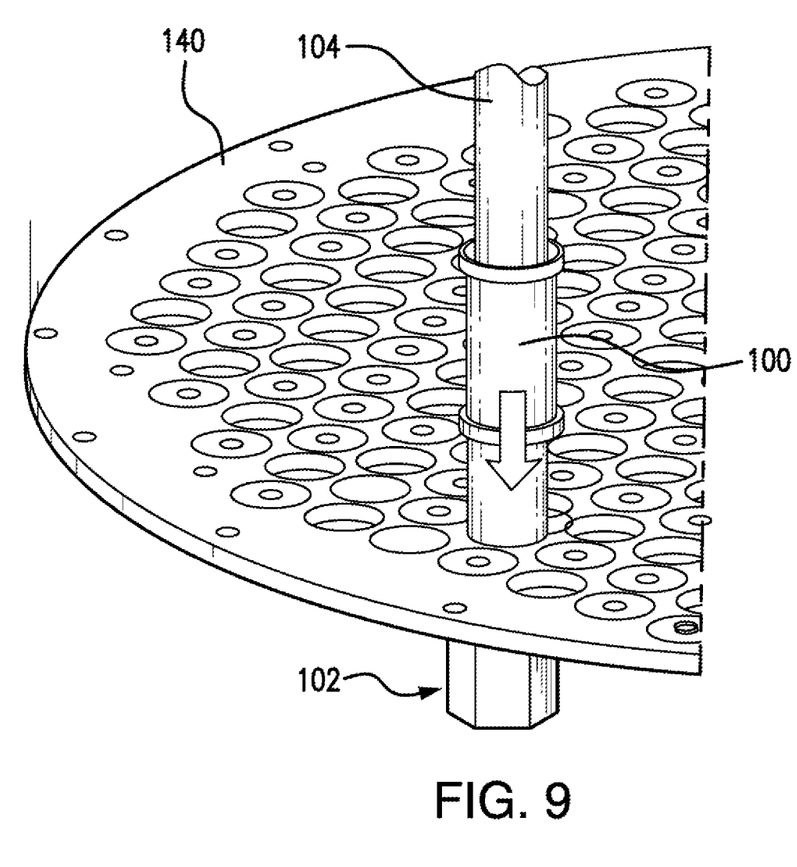
FIG. 9 is a perspective view of the fuel element plenum plate standoff spool shown in FIG. 8 mounted on a top end of a fuel element coolant flow tube.
Figure 10:
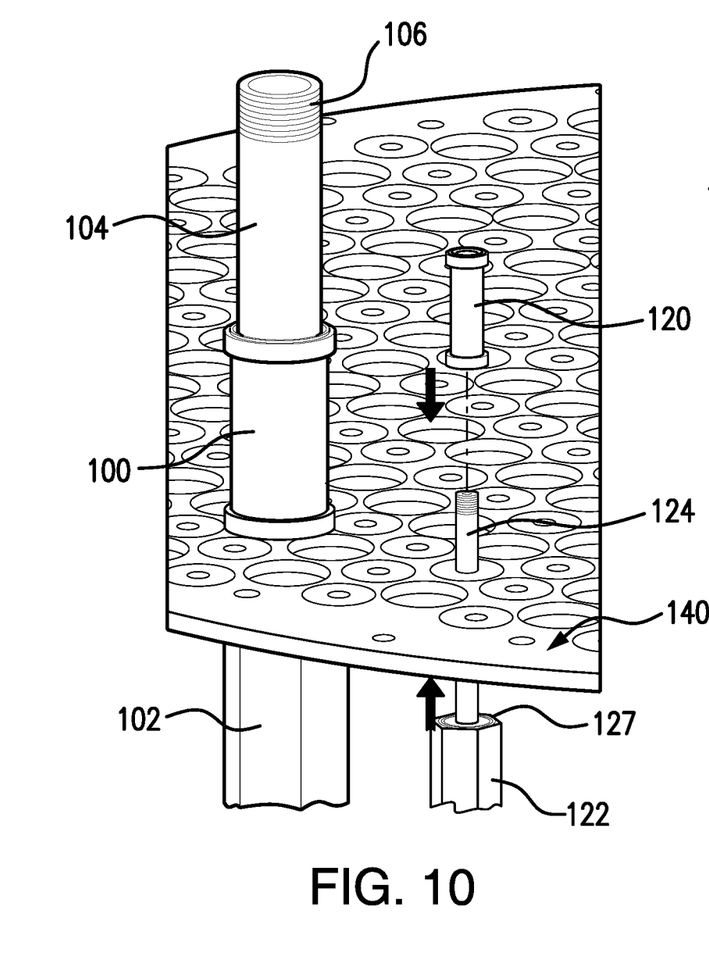
FIG. 10 is a perspective view of a moderator element plenum plate standoff spool in accordance with an embodiment of the present application, mounted on a moderator element coolant flow tube.

As previously noted, the plenum plate standoff spools 100, 101, 120 provide a gas seal between the plenum plates. Each spool's inner diameter allows the plenum plate standoff spool 100, 101, 120 to slide over the corresponding fuel element or moderator element coolant flow tube 104 and 124, respectively, as shown in FIGS. 9 and 10. The top and bottom ends of each spool contain a metallic seal 118, as shown in FIG. 8. Additionally, the spools 100, 101, 120 provide structural support between the plenum plates. An alternative embodiment involves welding the plenum plate standoff spools 100, 101, 120 to the plenum plates as long as the welds can be removed within a hot cell. Another alternative embodiment includes full length external threading of the fuel elements' and/or moderator elements' coolant flow tubes. This feature allows the locking nuts to be used directly on the flow tubes to lock the tubes between the moderator inlet plate. Due to space limitations between flow tubes, it may be impractical to tighten conventional nuts.

Figure 4:
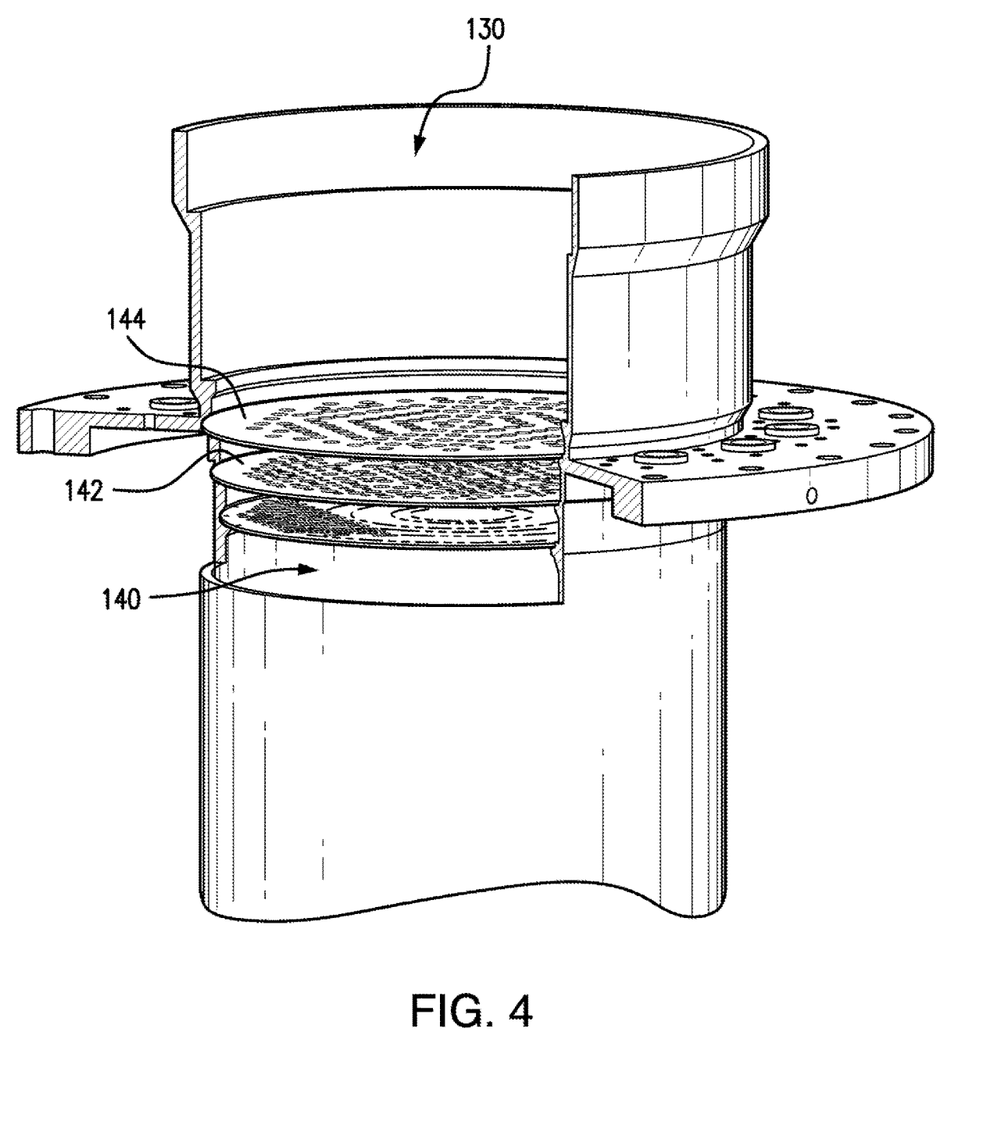
FIG. 4 is a partial cross-sectional view of an interface structure of the nuclear thermal propulsion rocket engine shown in FIGS. 3A and 3B.

Referring now to FIG. 4, an illustration of a section cut of the NTP reactor core's interface structure 130 shows how the plenum plates 140, 142, 144 are placed above the reactor core. Each plenum region between the plenum plates 140, 142, 144 experiences gas pressures that are different than the pressures other gas plenums. Preferably, the plenum plates 140, 142, 144 and interface structure 130 are made from aluminum, though a titanium alloy may also be considered. The reactor core's structural components are made from refractory metals.

Figure 5:
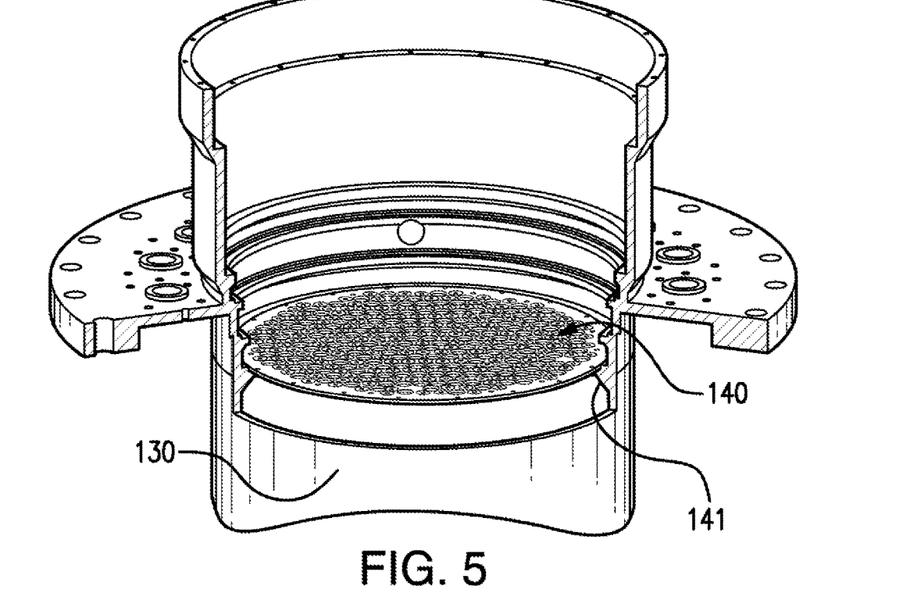
FIG. 5 is a partial cross-sectional view of the interface structure shown in FIG. 4, showing the moderator outlet plate.
Figure 6:
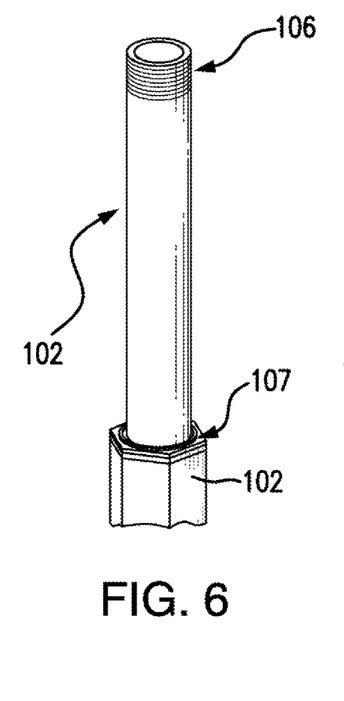
FIG. 6 is a partial perspective view of the top end of a fuel element of the nuclear thermal propulsion rocket engine shown in FIGS. 3A and 3B.
Figure 7:
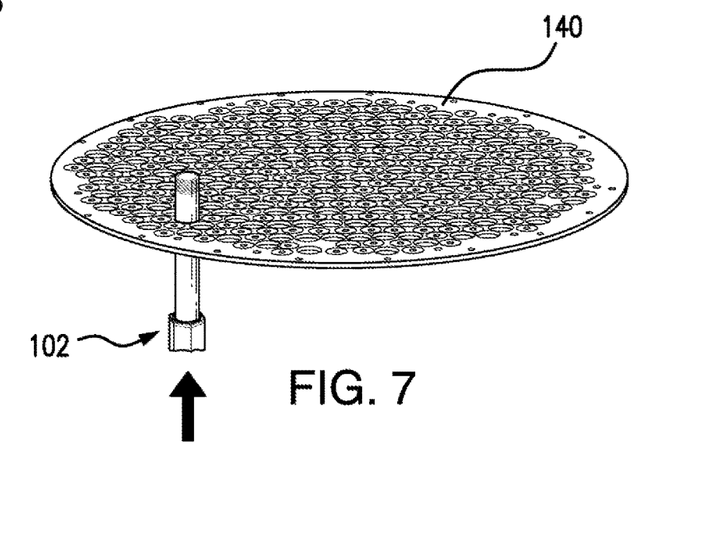
FIG. 7 is a perspective view of the fuel element shown in FIG. 6 inserted into an opening of the moderator outlet plate shown in FIG. 5.

FIG. 5 shows the installation of the moderator outlet plate 140 into the interface structure 130. The moderator outlet plate 140 is bolted down and sealed to the interface structure ledge 141. FIG. 6 shows the details of the top end of a fuel element 102. The top surface 107 of the hexagon shaped fuel element 102 provides a platform for making a gas sealing surface with the bottom of the moderator outlet plate 140. FIG. 7 shows the placement of the fuel element 102 into the moderator outlet plate 140.

Referring now to FIG. 8, a fuel element lower standoff spool 100 is shown. The fuel element plenum plate standoff spool's purposes are to provide vertical support between the plenum plates, provide a seal between the plenum plates, maintain uniform thermal expansion with the interface structure 130, and provide an internal pathway for routing the fuel element coolant flow tube 104. The fuel element plenum plate standoff spool 100 is made from the same material as the interface structure 130 to provide equal thermal expansion. The fuel element plenum plate standoff spool 100 has sealing grooves 119 on the upper and lower ends for placement of metallic sealing rings 118. The inner diameter of the fuel element plenum plate standoff spool 100 is sized to allow the refractory metal fuel element coolant flow tube 104 to be slidably received therein. FIG. 9 shows the placement of lower fuel element plenum plate standoff spool 100 being placed over the fuel element coolant flow tube 104.

Figure 11:
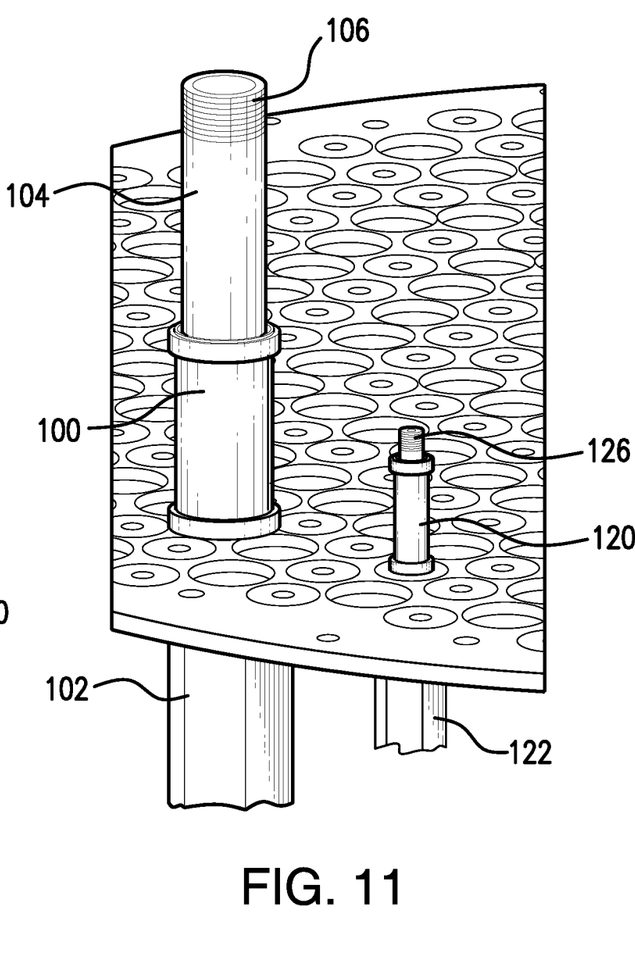
FIG. 11 is a perspective view of the fuel element and moderator element plenum plate standoff spools shown in FIGS. 9 and 10.
Figure 12:
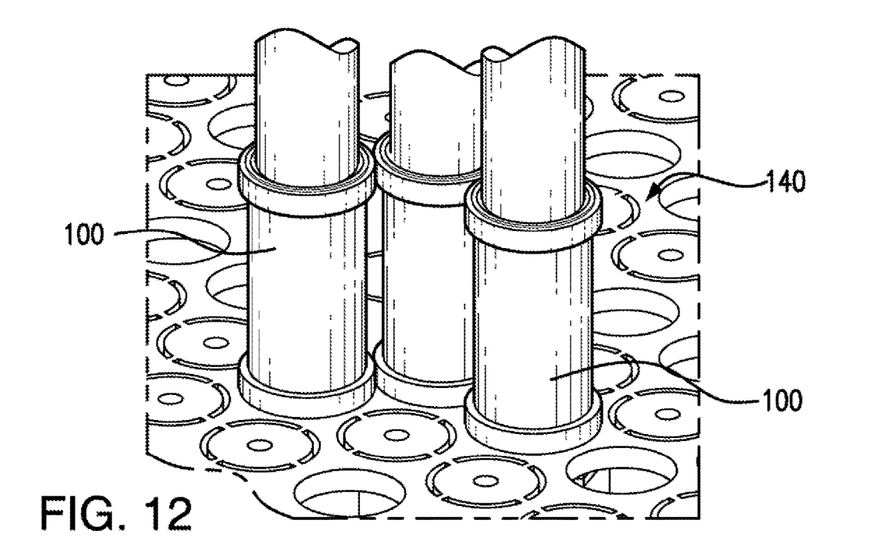
FIG. 12 is a perspective view of flow paths between fuel element plenum plate standoff spools installed on a moderator outlet plenum plate.

Referring now to FIG. 10, the placement of the moderator element 122 onto the bottom of the moderator outlet plate 140 is shown. The top surface 127 of the hexagon shaped moderator element 122 provides a gas sealing surface within the bottom of the moderator outlet plate 140. FIG. 11 shows the moderator standoff spool 120 placed over the flow tube 124 of the moderator element 122. FIG. 12 illustrates three fuel element plenum plate standoff spools 100 on top of the moderator outlet plate 140. The fuel element plenum plate standoff spools 100 are externally shaped to allow coolant gas in the moderator outlet plenum to pass between each spool.

Figure 13:
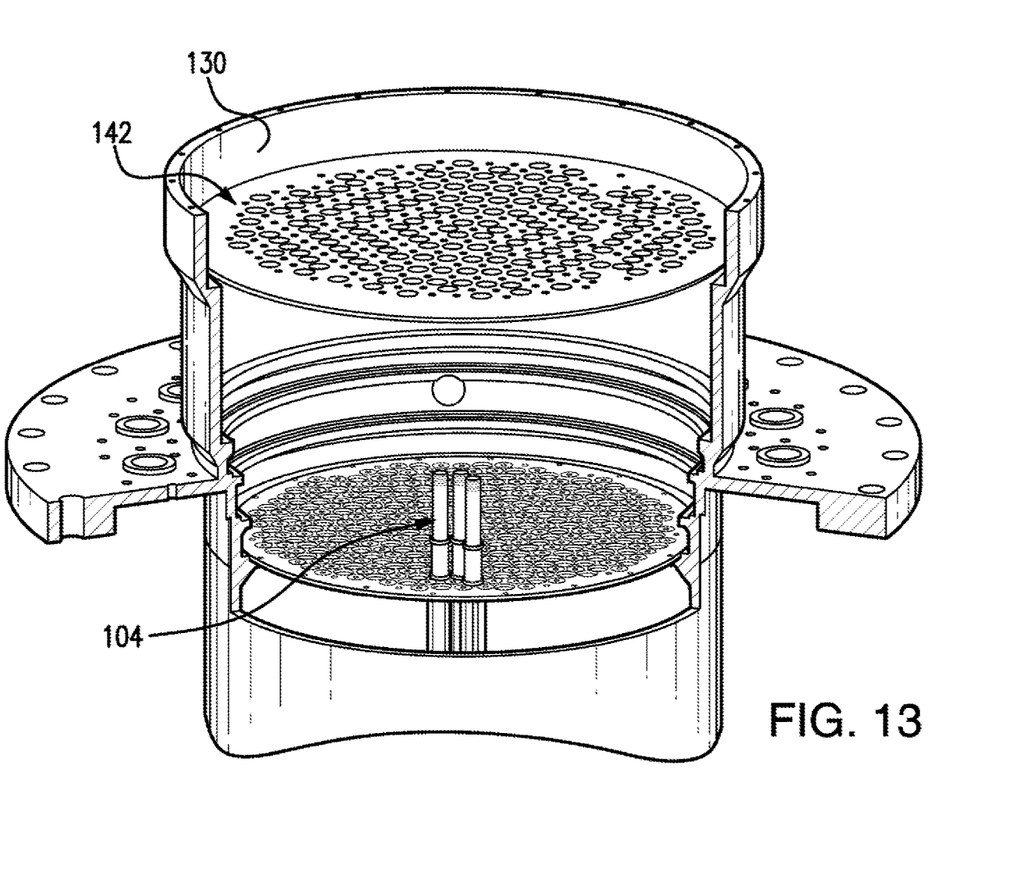
FIG. 13 is a partial cross-sectional view of installing a moderator inlet plenum plate to the interface structure of the nuclear thermal propulsion rocket engine shown in FIGS. 3A and 3B.

FIG. 13 shows the moderator inlet plate 142 being installed and bolted to the interface structure 130. The moderator inlet plate's flow tube holes align with the flow tube holes of the moderator outlet plenum plate 140. Note, the moderator element and moderator plenum plate standoff spools are not shown in FIGS. 12 and 13.

Figure 14:
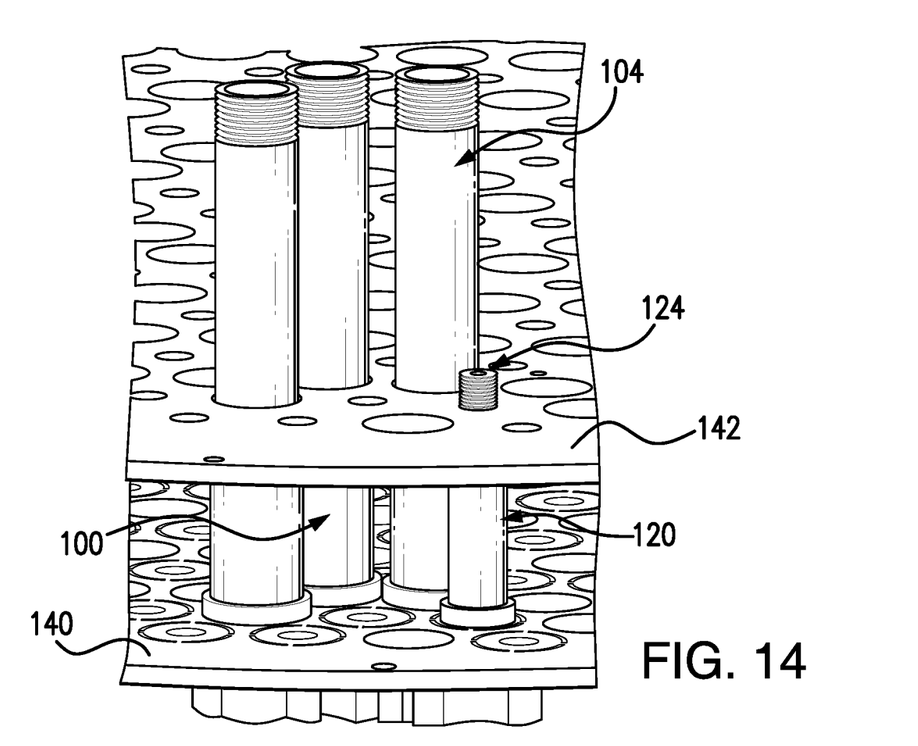
FIG. 14 is a perspective view of fuel element plenum plate standoff spools located between plenum plates.

As shown in FIG. 14, the fuel element and moderator element coolant flow tubes 104, 124 protrude through the moderator inlet plate 142. When the moderator inlet plate 142 is bolted to the interface structure 130 it sandwiches the fuel element and moderator element plenum plate standoff spools 100 and 120, respectively, between the plates, forming a gas seal on top and bottom of each plenum plate standoff spool 100, 120.

Figure 15:
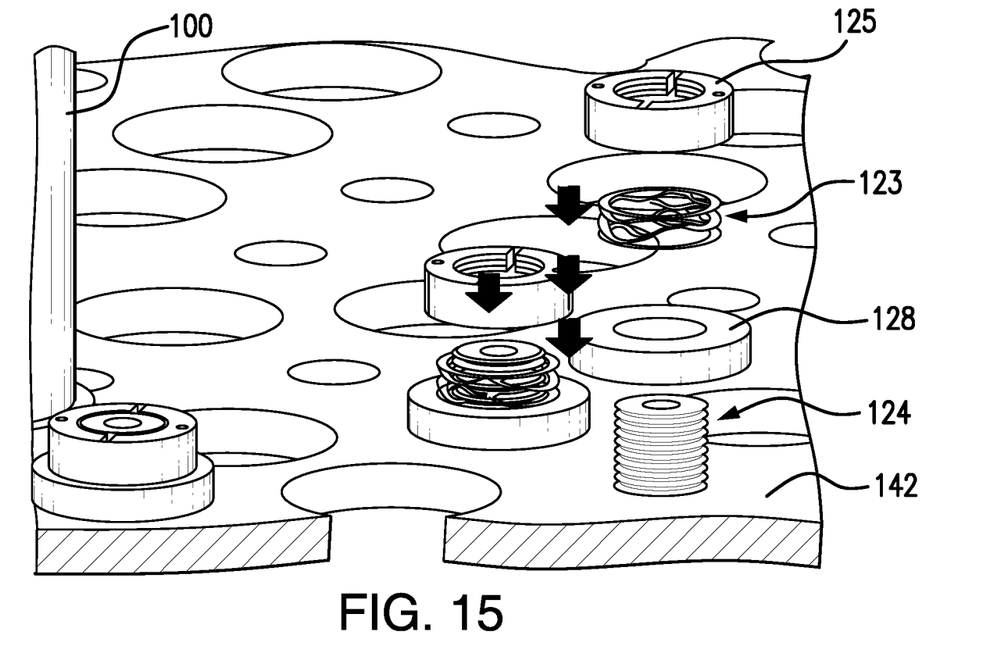
FIG. 15 is a perspective view locking nuts for securing the plenum plates to the standoff spools.

FIG. 15 shows the installation of the moderator element washer 128, wave spring 123 and locking nut 125. The wave spring 123 is used to retain the sealing pressure on the moderator element plenum plate standoff spool 120 while overcoming the differential thermal expansion between the aluminum plenum plate standoff spool and the refractory material moderator flow tube 124 during reactor operation. The locking nut 125 secures the top of the moderator element 122 to the bottom of the moderator outlet plate 140, as shown in FIG. 17, and forms a gas seal between the top of the moderator hexagon sealing surface 127 and the bottom of the moderator outlet plate 140. Prior to placing the fuel inlet plate 144 into the interface structure 130, the upper fuel element plenum plate standoff spools 101 are placed over all the fuel element coolant flow tubes 104.

Figure 16:
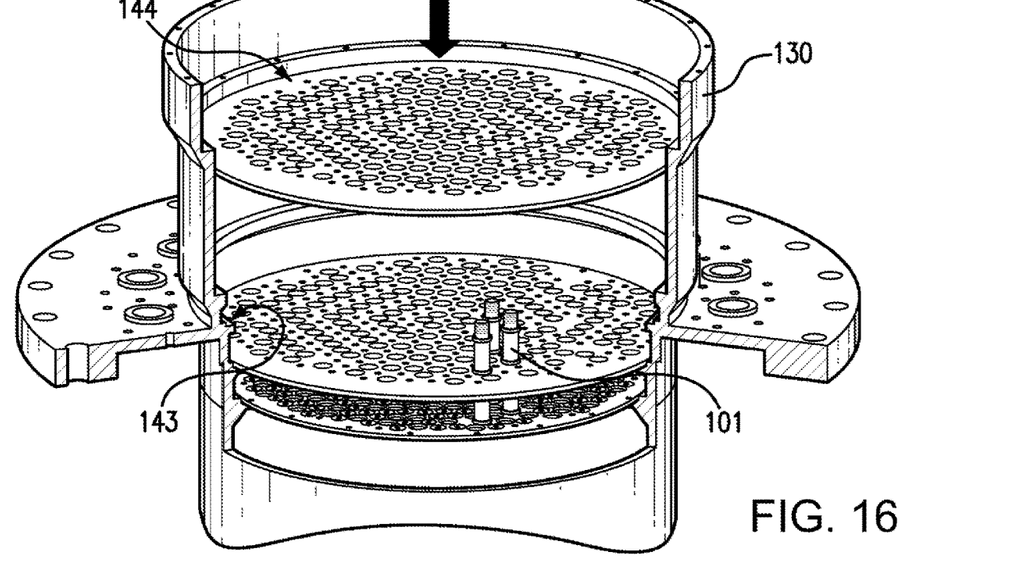
FIG. 16 is a partial cross-sectional view of installing a fuel element plenum plate to the interface structure of the nuclear thermal propulsion rocket engine shown in FIGS. 3A and 3B.

FIG. 16 shows the installation of the fuel inlet plenum plate 144 into the interface structure 130. The plate's fuel element coolant flow tube holes align with the fuel element coolant flow tubes holes of the other plenum plates 140, 142. The fuel element plenum plate 144 is bolted down to the interface structure ledge 143, thereby sealing the upper fuel element plenum plate standoff spool 101 between the upper two plenum plates 142, 144.

FIG. 17 illustrates the installation of the fuel element's washer 109, wave spring 110 and fuel element coolant flow tube locking nut 108. The wave spring 110 retains the sealing pressure on the plenum plate standoff spools 100, 101, 120 during the differential thermal expansion between the plenum plate standoff spool material and the fuel element coolant flow tube material. The locking nut 108 secures the fuel elements 102 to the bottom of the moderator outlet plate 140. The top surface 107 of the hexagon shaped fuel element 102 provides a gas seal surface with the bottom of the moderator outlet plate 140.

Some advantages of the plenum plate standoff spools discussed above are that they minimize gas leakage between plenum plates, provides vertical standoff supports of plenum plates, allow for differential thermal expansion between the plenum plates, pressure vessel, standoff spools, and the fuel element and moderator element coolant flow tubes while maintaining a gas tight seal, and the standoff spools provide a minimum spool footprint that is not possible with conventional locking nuts and tools. Note also, the previously discussed fuel element plenum plate standoff spools of the present disclosure may also be used with terrestrial nuclear reactors such as microreactors. Microreactors are nuclear reactors that are, because of their size, able to be disposed within semi-truck trailers, shipping containers, aircraft, etc, making them a readily portable source of power. Known microreactors are capable of producing one to twenty megawatts (MW) of power.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A nuclear reactor including a pressure vessel, comprising:
   a first plenum plate disposed within the pressure vessel, the first plenum plate defining a first plurality of apertures;
   a second plenum plate disposed within the pressure vessel, the second plenum plate being parallel to the first plenum plate and defining a first plurality of apertures;
   a fuel element including a fuel element coolant flow tube, the fuel element coolant flow tube extending through a first one of both the first pluralities of apertures of both the first and the second plenum plates; and
   a fuel element plenum plate standoff spool having a first end surface and a second end surface, the fuel element plenum plate standoff spool being disposed about a portion of the fuel element coolant flow tube that is disposed between the first and the second plenum plates,
   wherein the first and the second end surfaces of the fuel element plenum plate standoff spool abut the first and the second plenum plates, respectively.

2. The nuclear reactor of claim 1, further comprising a fuel element locking nut, wherein the fuel element locking nut is affixed to a top portion of the fuel element coolant flow tube.

3. The nuclear reactor of claim 2, further comprising a fuel element wave spring that is disposed between the fuel element locking nut and an upper surface of the second plenum plate.

4. The nuclear reactor of claim 3, further comprising a fuel element washer that is disposed between the fuel element wave spring and the upper surface of the second plenum plate.

5. The nuclear reactor of claim 2, wherein the fuel element locking nut includes a threaded inner surface defining a central bore, the top portion of the fuel element coolant flow tube includes a threaded outer surface, and the threaded inner surface engages the threaded outer surface.

6. The nuclear reactor of claim 2, wherein the fuel element locking nut is non-rotatably and axially affixed to the top portion of the fuel element coolant flow tube by one of a lock pin, welding, swaging, and an outwardly flared edge of the top portion and of the fuel element coolant flow tube.

7. The nuclear reactor of claim 1, further comprising:
   a second plurality of apertures defined by the first plenum plate;
   a second plurality of apertures defined by the second plenum plate;
   a moderator element including a moderator element flow tube, the moderator element flow tube extending through a first one of both the second pluralities of apertures of both the first and the second plenum plates; and
   a moderator element standoff spool having a first end surface and a second end surface, the moderator element standoff spool being disposed about a portion of the moderator element flow tube that is disposed between the first and the second plenum plates,
   wherein the first and the second end surfaces of the moderator element standoff spool abut the first and the second plenum plates, respectively.

8. The nuclear reactor of claim 1, wherein the fuel element plenum plate standoff spool comprises a first fuel element plenum plate standoff spool, further comprising:
   a third plenum plate disposed within the pressure vessel, the third plenum plate being parallel to the second plenum plate and defining a first plurality of apertures; and
   a second fuel element plenum plate standoff spool having a first end surface and a second end surface, the second fuel element plenum plate standoff spool being disposed about a portion of the fuel element coolant flow tube that is disposed between the second and the third plenum plates,
   wherein the first and the second end surfaces of the second fuel element plenum plate standoff spool abut the second and the third plenum plates, respectively.

9. The nuclear reactor of claim 1, wherein the nuclear reactor is a nuclear thermal space reactor.

10. A nuclear reactor including a pressure vessel, comprising:
    a first plenum plate disposed within the pressure vessel, the first plenum plate defining a first plurality of apertures;
    a second plenum plate disposed within the pressure vessel, the second plenum plate being parallel to the first plenum plate and defining a first plurality of apertures;
    a fuel element including a fuel element coolant flow tube configured to allow coolant flow therethrough, the fuel element coolant flow tube extending through a first one of both the first pluralities of apertures of both the first and the second plenum plates; and
    a fuel element plenum plate standoff spool being disposed about a portion of the fuel element coolant flow tube that is disposed between the first and the second plenum plates.

11. The nuclear reactor of claim 10, further comprising a fuel element locking nut, wherein the fuel element locking nut is affixed to a top portion of the fuel element coolant flow tube.

12. The nuclear reactor of claim 11, further comprising a fuel element wave spring that is disposed between the fuel element locking nut and an upper surface of the second plenum plate.

13. The nuclear reactor of claim 12, further comprising a fuel element washer that is disposed between the fuel element wave spring and the upper surface of the second plenum plate.

14. The nuclear reactor of claim 11, wherein the fuel element locking nut includes a threaded inner surface defining a central bore, the top portion of the fuel element coolant flow tube includes a threaded outer surface, and the threaded inner surface engages the threaded outer surface.

15. The nuclear reactor of claim 11, wherein the fuel element locking nut is non-rotatably and axially affixed to the top portion of the fuel element coolant flow tube by one of a lock pin, welding, swaging, and an outwardly flared edge of the top portion and of the fuel element coolant flow tube.

16. The nuclear reactor of claim 10, further comprising:
a second plurality of apertures defined by the first plenum plate;
a second plurality of apertures defined by the second plenum plate;
a moderator element including a moderator element flow tube, the moderator element flow tube extending through a first one of both the second pluralities of apertures of both the first and the second plenum plates; and
a moderator element standoff spool being disposed about a portion of the moderator element flow tube that is disposed between the first and the second plenum plates.

17. The nuclear reactor of claim 10, wherein the nuclear reactor is a nuclear thermal space reactor.

* * * * *

UNITED STATES PATENT AND TRADEMARK OFFICE
CERTIFICATE OF CORRECTION

| | | |
|---|---|---|
| PATENT NO. | : 11,724,830 B2 | Page 1 of 1 |
| APPLICATION NO. | : 17/025755 | |
| DATED | : August 15, 2023 | |
| INVENTOR(S) | : James B. Inman et al. | |

It is certified that error appears in the above-identified patent and that said Letters Patent is hereby corrected as shown below:

In the Specification

In Column 1, Lines 14 and 15, delete "DOE Award No. DE-AC07-051D14517" and insert --DOE Award No. DE-AC07-05ID14517--

Signed and Sealed this
Second Day of April, 2024

Katherine Kelly Vidal
*Director of the United States Patent and Trademark Office*